United States Patent
Arango Campo et al.

(10) Patent No.: US 12,195,399 B2
(45) Date of Patent: Jan. 14, 2025

(54) POZZOLANIC MIXTURE AND CEMENTING COMPOSITION

(71) Applicant: CEMENTOS ARGOS S.A., Medellín (CO)

(72) Inventors: Samuel Eduardo Arango Campo, Medellín (CO); César Pedrajas Nieto-Márquez, Medellín (CO); Claudia Patricia Rodríguez Hidalgo, Medellín (CO); Oscar Oswaldo Vásquez Torres, Medellín (CO)

(73) Assignee: Cementos Argos S.A., Medellín (CO)

( * ) Notice: Subject to any disclaimer, the term of this patent is extended or adjusted under 35 U.S.C. 154(b) by 393 days.

(21) Appl. No.: 17/598,155

(22) PCT Filed: Apr. 8, 2020

(86) PCT No.: PCT/IB2020/053365
§ 371 (c)(1),
(2) Date: Sep. 24, 2021

(87) PCT Pub. No.: WO2020/208552
PCT Pub. Date: Oct. 15, 2020

(65) Prior Publication Data
US 2022/0169570 A1    Jun. 2, 2022

(30) Foreign Application Priority Data

Apr. 12, 2019   (CO) .............................. 2019/0003760

(51) Int. Cl.
| | |
|---|---|
| C04B 14/06 | (2006.01) |
| C04B 14/28 | (2006.01) |
| C04B 28/04 | (2006.01) |
| C04B 28/14 | (2006.01) |
| C04B 40/00 | (2006.01) |
| C04B 28/16 | (2006.01) |
| C04B 103/00 | (2006.01) |

(52) U.S. Cl.
CPC .............. C04B 28/14 (2013.01); C04B 14/06 (2013.01); C04B 14/28 (2013.01); C04B 28/04 (2013.01); C04B 28/145 (2013.01); C04B 40/0042 (2013.01); C04B 28/16 (2013.01); C04B 2103/0088 (2013.01)

(58) Field of Classification Search
CPC ......... C04B 28/14; C04B 14/06; C04B 14/28; C04B 28/04; C04B 28/145; C04B 40/0042; C04B 28/16; C04B 2103/0088; C04B 20/0076; C04B 20/008; C04B 22/062; C04B 22/064; C04B 22/08; C04B 22/142; C04B 22/143; C04B 22/00; C04B 14/10; C04B 18/141; C04B 18/167; C04B 22/10; C04B 22/124; C04B 22/147
See application file for complete search history.

(56) References Cited

U.S. PATENT DOCUMENTS

| | | | |
|---|---|---|---|
| 5,584,926 A | 12/1996 | Borgholm et al. | |
| 5,626,665 A | * 5/1997 | Barger | ...................... C04B 7/13 |
| | | | 106/710 |
| 8,906,155 B2 | 12/2014 | Gasafi et al. | |
| 9,212,092 B2 | 12/2015 | Herfort et al. | |
| 9,630,878 B2 | 4/2017 | Raz et al. | |
| 10,336,652 B2 | 7/2019 | Berodier et al. | |
| 2012/0055376 A1 | * 3/2012 | Herfort | ................... C04B 20/04 |
| | | | 106/718 |
| 2020/0157003 A1 | 5/2020 | Barnes-Davin et al. | |

FOREIGN PATENT DOCUMENTS

| | | | |
|---|---|---|---|
| CN | 103803819 A | * | 5/2014 |
| WO | 2016198176 A1 | | 12/2016 |
| WO | 2017202849 A1 | | 11/2017 |
| WO | 2018178830 A1 | | 10/2018 |
| WO | 2018195624 A2 | | 11/2018 |

OTHER PUBLICATIONS

Antoni, M. et al., "Cement substitution by a combination of metakaolin and limestone" Cement and Concrete Research 42 (2012) 1579-1589. DOI:10.1016/j.cemconres.2012.09.006 (Year: 2012).*
Šiler, P et al. 2018 IOP Conf. Ser.: Mater. Sci. Eng. 379 012033. DOI:10.1088/1757-899X/379/1/012033 (Year: 2018).*
Khan, M.S.H., Nguyen, Q.D., Castel, A. (2018). Carbonation of Limestone Calcined Clay Cement Concrete. In: Martirena, F., Favier , A., Scrivener, K. (eds) Calcined Clays for Sustainable Concrete. RILEM Bookseries, vol. 16. Springer, Dordrecht. DOI:10.1007/978-94-024-1207-9_38 (Year: 2018).*
CN-103803819-A, machine translation (Year: 2014).*
Geology (Marble) [retrieved from the internet at Oct. 20, 2023 from <URL:https://web.archive.org/web/20081231141733/https://geology.com/rocks/marble.shtml>] (Year: 2008).*
Marchiol, T. The Difference Between Cement, Concrete, and Mortar 2018 [retrieved from the internet at Oct. 23, 2023 from <URL: https://www.linkedin.com/pulse/difference-between-cement-concrete-mortar-tanya-marchiol#: ~: text=Cement%2C%20concrete%2C%20and%20mortar%20are,cement%2C%20sand%2C%20and%20gravel.>] (Year: 2018).*
Seegebrecht, G. The Role of Aggregate in Concrete, Concrete Network 2010 [retrieved from the internet at Oct. 23, 2023 from <URL: https://web.archive.org/web/20100726083310/http://www.concretenetwork.com:80/aggregate/> and <URL:https://www.concretenetwork.com/aggregate/>] (Year: 2010).*

(Continued)

Primary Examiner — Anthony J Green
Assistant Examiner — Marites A Guino-O Uzzle
(74) Attorney, Agent, or Firm — The Morales Law Firm; Joseph L. Morales, Esq.

(57) ABSTRACT

The present invention is directed to a pozzolanic mixture used as a supplementary cementitious material (SCM) comprising an activated clay, a limestone and a setting regulator. Moreover, it is also directed to a cementitious composition comprising said pozzolanic mixture, a clinker and a setting regulator. Finally, the invention is also directed to a concrete comprising the cementitious composition described above, fine aggregate, coarse aggregate and water, optionally the concrete may have other additives.

10 Claims, 5 Drawing Sheets

(56) References Cited

OTHER PUBLICATIONS

Norma ASTM C33 Standard Specification for Concretes Aggregates ASTM Designation C33-99a-1. Annual Book of ASTM Standards, vol. 14 [On line] (2002) [Recuperado el May 26, 2020] Recuperado de https://www.academia.edu/12181159/ASTM_C33_Traslate5 Annual Book of ASTM Standards, vol. 14.02.

Pedrajas, C. Contribución al análisis y estudio del omportamiento reológico de pastas frescas de cemento Portland con adiciones minerales activas, tipo puzolana, y no activas, tipo filler [On line] (2015) [Recuperado el May 26, 2020] Recuperado de.

Icontec. (2020). Cementos. Terminologia relacionada con el cemento hidráulico y otros cementos inorgánicos (NTC31:2020).

Icontec. (2019). Cenizas volantes y puzolanas naturales, calcinadas o crudas, para uso en el concreto (NTC3493:2019).

Icontec. (2022). Cementos. Especificaciones para mezclas de materiales cementantes suplementarios (NTC6312:2022).

Associação Brasileira de Normas Técnicas. (1991). Cimento Portland composto (NBR 11578).

Fernandez-Lopez, R. Flash calcination of clayey soils as a potential replacement for cement in developing countries (2010).

Martirena, F., Antoni, M., and Scrivener, K. Production of activated clays for low-cost building materials in developing countries (2009).

De Weerdt, K. Blended Cement with Reduced CO2 & Emission—Utilizing the Fly Ash Limestone Synergy (2011).

Bonavetti, V. L., Rahhal, V. F., and Irassar, E. F. Studies on the carboaluminate formation in limestone filler-blended cements (2001).

Jorge, L. Ramírez, Suárez. (2015). Evaluación de arcillas del yacimiento la delta como fuente de materia prima para la producción de materiales cementicios suplementarios. Instituto Superior Minero Metalúrgico de Moa, Facultad de Metalurgia y Electromecánica. pp. 14 to 17. http://ninive.ismm.edu.cu/bitstream/handle/123456789/2480/RamirezSuarez.pdf?sequence= 1&isAllowed=y.

\* cited by examiner

POZZOLANIC MIXTURE AND CEMENTING COMPOSITION

FIELD OF THE INVENTION

The present invention is in the field of cement industry materials, particularly supplementary cementitious materials for the production of cements and concretes.

DESCRIPTION OF THE BACKGROUND ART

Historically, the cement industry has produced cement from clinker and gypsum to obtain different types of cement, such as general use cements, high early strength cements, cements for concrete production, and structural cements, among others. However, the clinker production process is an important source of emissions, particularly $CO_2$ emissions, which come from the limestone decarbonation process and the use of fuels for burning limestone and clay at temperatures between 1000 and 1500° C., which Moreover entails high production costs. These are the reasons why supplementary cementitious materials (SCM) have been used to reduce the clinker amount in the mixes. Among other characteristics, the reduction of the clinker amount in cement depends on the selection of SCM, which in turn depends on the availability and feasibility of these materials in cement plants and their pozzolanic properties.

SCM include those available in nature, such as natural pozzolans, or industrial by-products, such as fly ash, blast furnace slag and silica fume. However, as part of the continuous search to find other alternatives to reduce the use of clinker in cement, industry and researchers have been working on the development and production of new SCM.

Within the different SCM, calcined clays are considered a promising material, not only due to their availability, but also due to their high ability to reduce the percentage of clinker in cement. For example, U.S. Pat. No. 5,298,251 discloses cementitious systems comprising gypsum, a pozzolan-like calcined clay, a clinker, and optionally alkalis. There is optionally a pozzolanic mixture in said cementitious system comprising: calcined clay and at least one of the following: gypsum, hydrated kiln dust, hydrated lime, hydrated lime kiln dust, fly ash, and an organic plasticizing agent. On the other hand, U.S. Pat. No. 5,584,926 also discloses a cement composition, but this comprises a clinker, sulfide, fluorine and a carbonate extender, wherein the carbonate extender may be an artificial pozzolan, such as calcined clay.

The cement disclosed in U.S. Pat. No. 9,212,092 is characterized in that it preserves high mechanical strengths at low clinker contents. Said cement is based on Portland cement, a heat-treated clayey material and a carbonate material (optionally heat-treated), and optionally, a sulfate material. Wherein, the clayey material is substantially dehydroxylated and has at least 90% w/w of clayey materials which belong to the group of kaolin, smectite or vermiculite, or mixtures thereof, and wherein the carbonate material refers to a solid material composed mainly of carbonate minerals.

However, the production of alternative SCM continues to be an active technical field of research and development, searching for materials that allow better performance, for example related to durability properties. For example, among the existing difficulties in incorporating new SCM in cement and concrete, there are problems of flowability, workability and delivery of mix at the site, as well as those difficulties in the resulting concrete in its hardened state, for example, in relation to its mechanical strength. In addition, among the durability problems faced by SCM there are those generated by different aggressive chemical attacks such as chloride ion.

The present invention is directed to an SCM, with controlled quality according to its composition, and which allows substantially reducing the clinker amount in cements and concretes, but at the same time obtaining equal or superior performances, from the technical point of view, in characteristics such as mechanical resistance, Blaine, density, durability, retained material, characteristics in fresh state as the facility to be applied (workability), water demand, additive consumption, among others and its behavior in time compared with other cements containing other SCM. Moreover, and from the economic point of view, the developed SCM allow a lower energy consumption in their production, among other technical advantages.

BRIEF DESCRIPTION OF THE INVENTION

The present invention is directed to a pozzolanic mixture, useful as a supplementary cementitious material (SCM) comprising an activated clay between 20 and 85%, a limestone between 10 and 75%, and a setting regulator between 3 and 15%. Moreover, it is also directed to a cementitious composition comprising said pozzolanic mixture in at least 20%, a clinker between 35 and 75%, and a setting regulator between 1 and 10%. Finally, it is also directed to a concrete comprising said cementitious composition between 10 and 25%, a fine aggregate between 25 and 45%, a coarse aggregate between 25 and 55%, and water between 5 and 10%.

The present invention is directed to a pozzolanic mixture, useful as a supplementary cementitious material (SCM) comprising an activated clay between 20 and 85%, a limestone between 10 and 75%, and a setting regulator between 3 and 15%. Moreover, it is also directed to a cementitious composition comprising said pozzolanic mixture in at least 20%, a clinker between 35 and 75%, and a setting regulator between 1 and 10%. Finally, it is also directed to a concrete comprising said cementitious composition between 10 and 25%, a fine aggregate between 25 and 45%, a coarse aggregate between 25 and 55%, and water between 5 and 10%.

DETAILED DESCRIPTION OF THE INVENTION

Figure 1:
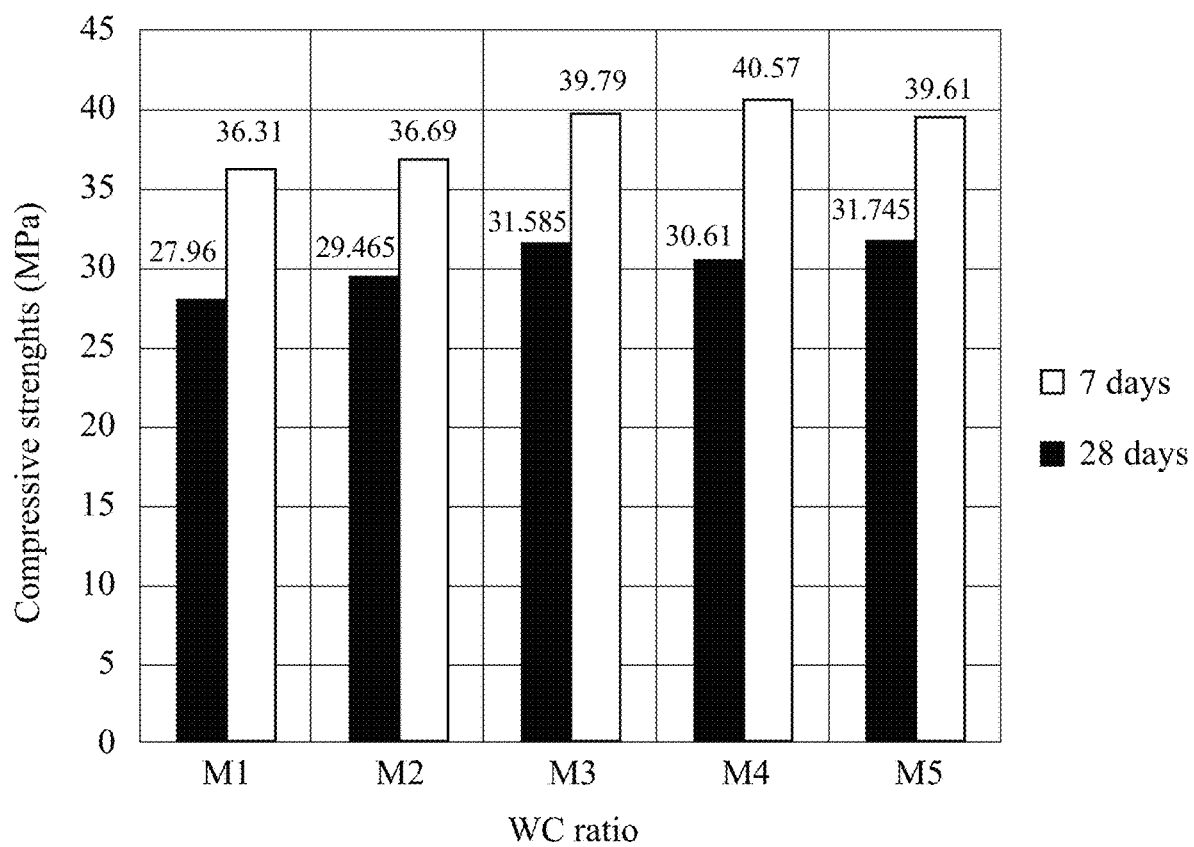
FIG. 1 shows the behavior of the Mechanical Compressive Strength (M.C.S.) of a cementitious mix composed of 80% w/w Portland cement and 20% w/w M1 to M5 limestone clay mix at the age of 7 and 28 days.

A pozzolanic mixture, useful as a supplementary cementitious material (SCM) comprising an activated clay, a limestone, and a setting regulator was developed. Moreover, a cementitious composition comprising a pozzolanic mixture, a clinker, and a setting regulator was developed. Finally, a concrete comprising a cementitious composition, a fine aggregate, a coarse aggregate and water was also developed.

Pozzolanic Mixture

The present invention is directed to a pozzolanic mixture useful as a supplementary cementitious material (SCM). For the purposes of this application, pozzolanic mixture means a composition comprising an activated clay, a limestone and a setting regulator. The term "pozzolanic mixture" also refers to the term "pozzolanic mix". The pozzolanic mix of the present invention is useful as a SCM in the formulation of a cementitious composition and in the formulation of a concrete, among others. In particular with the pozzolanic mix disclosed herein, different cements meeting ASTM C1157 may be dosed: GU (general use), HE (high early strength), MS (moderate sulfate resistance) and MH (moderate heat of hydration), among others.

The amounts described below are in % w/w, which corresponds to percentages by weight, unless a different ratio is indicated.

For the purposes of the present invention, activated clay is understood to mean a clay that has been subjected to a thermal or chemical activation process, for example by calcination at a temperature between 550 and 850° C. Activated clay is also to be understood as "calcined clay". Clay (without being subjected to an activation process) comprises one or more of the following clay minerals: ilite, gibbsite, goethite, montmorillonite, illite, kaolinite, chlorites, micas, muscovites, halloysite, metahalloysite and quartz or mixtures thereof.

In one embodiment, the activated clay is a mixture of several activated clays with different characteristics, or an activated clay and one or more inactivated clays.

The activated clay of the present application is mineralogically characterized in that it comprises one or more of quartz, kaolinite-1A, mica (Muscovite 2-M1), mica (Illite-1M), vermiculite-2M, anatase, talc, microcline, albite, clinochlore-IIb-2, hematite, alpha hematite, pyrite and/or amorphous, and mixtures thereof. In particular, the activated clay is characterized in that it comprises quartz and amorphs, wherein the quartz is between 10 and 90% or between 20 and 76%, and wherein the amorphs are between 10 and 80%, between 20 and 80%, or between 20 and 70%. The activated clay used in the present invention may be a mixture of different calcined clays with different mineralogical and chemical characteristics.

Regarding the chemical composition of the activated clay, it has an $Al_2O_3$ content greater than 10%, between 10 and 50%, or between 15 and 30%. Moreover, the activated clay has an $Fe_2O_3$ content greater than 5%, between 1 and 60%, between 3 and 20%, or between 5 and 20%. The activated clay comprises other components, such as $SiO_2$, $Na_2O$ and $K_2O$. It also has LOI values between 0.1 and 5%.

Wherein, as a person moderately versed in the subject would understand the term LOI corresponds to loss on calcination (loss on ignition) which is determined by heating a sample with known mass at a temperature of 900° C. to 1000° C., until mass constancy is obtained. The mass loss of the sample is then determined. Normally, a large loss on ignition is an indication of bound and/or absorbed water, organic compounds (NOx, SOx) and carbonation ($CO_2$), which may result from the material itself, from prolonged or improper storage, or from adulteration during transport. The calcination loss test of the examples was performed in accordance with ASTM C 114 (AASHTO T 105), COVENIN 0109, IRAM 1504, NCh147, NGO 41003 h18, NMX-C-151-ONNCCE, NTC 184, NTE 0160, NTP334.086 and UNIT-NM 18.

However, another useful calcined clay as understood by a person moderately versed in the matter may also be used in the pozzolanic mixture developed. The activated clay is in the pozzolanic mixture in an amount between 10 and 90%, between 20 and 80%, between 50 and 80%, between 40 and 70%, between 20 and 85%, between 30 and 70%.

Activated clay with the characteristics highlighted in this document allows reducing the clinker/cement factor of any cement without affecting the performance of the resulting cement. Due to its high, fast and early pozzolanic activity, i.e., its fast reaction with the calcium hydroxide present in the system resulting from the hydration of Portland clinker, which offers differentiated results when compared to other SCM, obtaining for example better performances at earlier ages compared to other SCM. In addition, it is capable of producing cementitious compounds in synergy with cement hydration from the first days of hydration (1-3-7 days). It also allows the formulation of cements with high durability against $Cl^-$ ion attack and against ASR (alkali-aggregate reaction).

On the other hand, limestone corresponds to a metamorphic rock composed mainly of calcite, forming marble; additionally, aragonite and secondary minerals such as wollastonite, graphite, chlorite, talc, mica, quartz, pyrite and some precious stones such as corundum, garnet or zirconite may appear. More particularly the limestone of the present invention is characterized by being a metamorphic limestone. The function of limestone in cement hydration may be dual. Without being a definitive theory, limestone participates chemically, by favoring the production of carboaluminates (Mono and Hemi), and physically, by promoting cement hydration through its filling effect in the pozzolanic mixture.

Limestone is more than 60% calcium carbonate ($CaCO_3$), at least 50% calcium carbonate ($CaCO_3$), between 70 and 80% or between 80 and 99% calcium carbonate. A chemical analysis of the limestone will indicate it is composed primarily of CaO and loss on ignition (LOI) associated with the release of $CO_2$. Wherein CaO is at least 30%, between 10 and 56%, between 30 and 56%, between 40 and 56%, or between 30 and 56%. Wherein the LOI is at least 20%, between 20 and 70%, between 25 and 55%, between 30 and 50%, or between 20 and 45%.

However, the pozzolanic mix developed may comprise another useful limestone as understood by a person moderately skilled in the art. Limestone is contained in the pozzolanic mixture in an amount between 5 and 80%, between 20 and 75%, between 20 and 60%, between 45 and 60%, between 10 and 75%, between 15 and 60%.

In one embodiment, the activated clay and limestone are in a ratio between 1:1 and 3:1, between 3:1 and 1:1.

Moreover, the setting regulator of the pozzolanic mix is used to delay or regulate the setting of the material, ensuring its workability for an optimum period of time. Thus, the regulator becomes important in large cement substitutions to guarantee the correct cement hydration.

For purposes of the present invention, the setting regulator is of natural or synthetic origin and it is selected from, but not limited to, calcium sulfate dihydrate ($CaSO_4 \cdot 2H_2O$—gypsum), calcium sulfate hemihydrate ($CaSO_4 \cdot 0.5H_2O$—basanite), calcium sulfate ($CaSO_4$—anhydrite), gypsum with $SO_4^{-2}$ anion and/or a combination thereof. However, another useful setting regulator as understood by a person moderately skilled in the art may also be used in the pozzolanic mixture. The setting regulator is in the pozzolanic mixture in an amount between 1 and 20%, between 3 and 10%, between 3 and 8%, or between 3 and 15%.

The pozzolanic mixture is found in suitable sizes for its implementation in cements or cementitious compositions. For this reason, a particle size reduction process may be carried out by grinding or crushing the mixture of activated clay, limestone and setting regulator. The pozzolanic mixture may also be obtained with activated clay, limestone and setting regulator previously ground individually. The pozzolanic mixture of the present application has a particle size less than 75 microns, between 44 and 75 microns, or less than 44 microns.

Moreover, the pozzolanic mix has a Blaine specific surface area between 6500 and 10000 $cm^2/g$, between 6500 and 7500 $cm^2/g$, between 5000 and 10000 $cm^2/g$.

Cementitious Composition

The cementitious composition or cement formulation developed is used for the preparation of pastes, mortars and concretes. The cementitious composition may be formulated into a pozzolanic-type cement, blended or composite cements, general use cement (GU), high early strength (HE), moderate sulfate strength (MS), high sulfate strength (HS), moderate heat of hydration (MH), low heat of hydration (LH), structural cement, concrete cement, soil cement and masonry. For example, different HE, GU, MS and MH cements may be proportioned in accordance with ASTM C1157. For example, when the cementitious composition has a clinker content between 40 and 55% is for general use, a clinker content between 55 and 65% is for structural use, and a clinker content between 65 and 75% is for concrete use. The cementitious composition is used in a concrete.

The clinker of the cementitious composition is defined as a binder or hydraulic conglomerate obtained from raw materials such as limestone and clays from geological formations which are extracted, crushed, ground, mixed and kiln-finished.

The cementitious composition of the present invention decreases by as much as 20% to 55% the clinker amount used in relation to Portland cement.

Preferably the mineralogical composition of the clinker used comprises C3S—Alite, C2S—Belite, calcium oxide—lime, brownmillerite, C3A, magnesium oxide—periclase, potassium sulfate, beta—Arcanite. The clinker consists of a mixture of C3S and C2S silicates, C3A aluminates and C4Af calcium ferrite aluminate. The clinker has a C3S content greater than 50%, between 40 and 80%, or between 45 and 70%. The clinker has a C3A content greater than 2%, between 1 and 10%, or between 2 and 6,5%.

In the present invention the clinker is selected from OPC (Ordinary Portland Cement) clinker. However, another useful clinker according to the understanding of a person averagely versed in the art may also be used in the cementitious composition. The clinker is in the cementitious composition in an amount between 35 and 80%, between 35 and 65%, between 40 and 50%, between 35 and 60%, between 55 and 35%, between 65 and 75%.

The cementitious composition also comprises a setting regulator which is used to control the setting of the material, i.e., it ensures its workability for an optimum period of time.

The setting regulator is selected from calcium sulfate dihydrate ($CaSO_4 \cdot 2H_2O$—gypsum), calcium sulfate hemihydrate ($CaSO_4 \cdot 0.5H_2O$—basanite), calcium sulfate ($CaSO_4$—anhydrite), gypsum with $SO_4^{-2}$ anion, and/or a combination thereof. The setting regulator may be the same or different from the setting regulator of the pozzolanic mixture. However, another useful setting regulator as understood by a person moderately skilled in the art may also be used. The setting regulator is in the cementitious composition in an amount between 1 and 10%, between 1 and 5%, between 3 and 6%, or between 5 and 10%, between 4 and 8%.

The cementitious composition comprises a pozzolanic mixture that is useful as a SCM, which comprises an activated clay, a limestone, and a setting regulator, as described below. The pozzolanic mixture is in the cementitious composition at least 20%, between 20 and 65%, between 20 and 60%, between 20 and 30%, between 30 and 40%, or between 40 and 60%.

For the purposes of the present invention, activated clay is understood to mean a clay that has been subjected to a thermal or chemical activation process, for example by calcination at a temperature between 550 and 850° C. Activated clay is also to be understood as "calcined clay". Clay (without being subjected to an activation process) comprises one or more of the following clay minerals: ilite, gibbsite, goethite, montmorillonite, illite, kaolinite, chlorite, micas, muscovite, halloysite, metahalloysite or mixtures thereof.

In one embodiment, the activated clay is a mixture of several activated clays with different characteristics, or an activated clay and one or more inactivated clays.

The activated clay of the present application is mineralogically characterized in that it comprises one or more of quartz, kaolinite-1A, mica (Muscovite 2-M1), mica (Illite-1M), vermiculite-2M, anatase, talc, microcline, albite, clinochlore-IIb-2, hematite, alpha hematite, pyrite and/or amorphous, and mixtures thereof. In particular, the activated clay is characterized in that it comprises quartz and amorphs, wherein the quartz is between 10 and 90% or between 20 and 76%, and wherein the amorphs are between 10 and 80%, between 20 and 80%, or between 20 and 70%. The activated clay used in the present invention may be a mixture of different calcined clays with different mineralogical and chemical characteristics.

Regarding the chemical composition of the activated clay, it has an $Al_2O_3$ content greater than 10%, between 10 and 50%, or between 15 and 30%. Moreover, the activated clay has an $Fe_2O_3$ content greater than 5%, between 1 and 60%, between 3 and 20%, or between 5 and 20%. The activated clay comprises other components, such as $SiO_2$, $Na_2O$ and $K_2O$.

Wherein, as a person moderately versed in the subject would understand, the term LOI corresponds to loss on calcination (loss on ignition) which is determined by heating a sample with known mass at a temperature of 900° C. to 1000° C., until mass constancy is obtained. Then, the mass loss of the sample is determined. Normally, a large loss on ignition is an indication of pre-hydration (water content), organic compounds (NOx, SOx) and carbonation ($CO_2$), which may result from the material itself, from prolonged or improper storage, or from adulteration during transport. The calcination loss test of the examples was performed in accordance with ASTM C 114 (AASHTO T 105), COVENIN 0109, IRAM 1504, NCh147, NGO 41003 h18, NMX-C-151-ONNCCE, NTC 184, NTE 0160, NTP334.086 and UNIT-NM 18.

However, another useful calcined clay may also be used in the pozzolanic mixture developed, as understood by a person moderately versed in the matter. The activated clay is in the pozzolanic mixture in an amount between 10 and 90%, between 20 and 80%, between 50 and 80%, between 40 and 70%, between 20 and 85%, between 30 and 70%. The activated clay is in the cementitious composition in an amount between 1 and 50%, between 10 and 30%, between 10 and 25%, between 15 and 35%, between 15 and 45%, between 15 and 25%.

Activated clay with the characteristics highlighted in this document allows reducing the clinker/cement factor of any cement without affecting the performance of the resulting cement. Due to its high, fast and early pozzolanic activity, i.e., its fast reaction with the calcium hydroxide present in the system resulting from the hydration of Portland clinker, it offers differentiated results when compared to other SCM, obtaining for example performances at earlier ages than in the case of other SCM. An early pozzolanic activity means it is capable of producing cementitious compounds in synergy with cement hydration from the first days of hydration (1-3-7 days). It also makes it possible to formulate cements with high durability against ion attack and against ASR (alkali-aggregate reaction).

On the other hand, limestone corresponds to a metamorphic rock composed mainly of calcite, forming marble; additionally, aragonite and secondary minerals such as wollastonite, graphite, chlorite, talc, mica, quartz, pyrite and some precious stones such as corundum, garnet or zirconite may appear. More particularly the limestone of the present invention is characterized in that it is a metamorphic limestone. The function of limestone in cement hydration may be dual. Without being a definitive theory, limestone participates chemically, by favoring the production of carboaluminates (Mono and Hemi), and physically, by promoting cement hydration through its filling effect in the pozzolanic mixture.

The limestone has an amount of more than 60% calcium carbonate ($CaCO_3$), at least 50% calcium carbonate ($CaCO_3$), between 70 and 80% or between 80 and 99% calcium carbonate. Preferably, the limestone used in the pozzolanic mixture has mainly CaO and LOI. Wherein CaO is at least 30%, between 10 and 70%, between 30 and 60%, between 40 and 60%, or between 30 and 56%. Wherein the LOI is at least 20%, between 20 and 70%, between 25 and 55%, between 30 and 50%, or between 20 and 45%.

However, the pozzolanic mix developed may comprise another useful limestone, as understood by a person moderately skilled in the art. The limestone is in the pozzolanic mixture in an amount between 5 and 80%, between 20 and 75%, between 20 and 60%, between 45 and 60%, between 10 and 75%, between 15 and 60%. Limestone is in the cementitious composition in an amount between 1 and 40%, between 1 and 30%, between 5 and 30%, between 8 and 30%, or between 4 and 29%.

In one embodiment, the activated clay and limestone are in a ratio between 1:1 and 3:1, between 3:1 and 1:1.

Moreover, the setting regulator of the pozzolanic mix is used to delay or regulate the setting of the material, ensuring its workability for an optimum period of time. Thus, the regulator becomes important in large cement substitutions to guarantee the cement correct hydration.

For purposes of the present invention, the setting regulator is of natural or synthetic origin and it is selected from, but not limited to, calcium sulfate dihydrate ($CaSO_4.2H_2O$—gypsum), calcium sulfate hemihydrate ($CaSO_4.0.5H_2O$—basanite), calcium sulfate ($CaSO_4$—anhydrite), gypsum with $SO_4^{-2}$ anion and/or a combination thereof. However, another useful setting regulator as understood by a person moderately skilled in the art may also be used in the pozzolanic mixture. The setting regulator is in the pozzolanic mixture in an amount between 1 and 20%, between 3 and 10%, between 3 and 8%, or between 3 and 15%. The setting regulator of the pozzolanic mixture is in the cementitious composition in an amount between 1 and 5%, between 2 and 3%, between 1 and 4%.

The pozzolanic mixture is found in suitable sizes for its implementation in cements or cementitious compositions. For this, a particle size reduction process may be carried out by grinding or crushing the mixture of activated clay, limestone and setting regulator. The pozzolanic mixture may also be obtained with activated clay, limestone and setting regulator previously ground individually. The pozzolanic mixture of the present application has a particle size of less than 75 microns, between 44 and 75 microns, or less than 44 microns.

Moreover, the pozzolanic mixture has a Blaine specific surface area between 6500 and 10000 $cm^2/g$, between 6500 and 7500 $cm^2/g$, between 5000 and 10000 $cm^2/g$.

Optionally, the cementitious composition comprises an alkaline activator, which is defined as a stimulant or accelerator in charge of generating a basic medium that allows the dissolution of all the cement phases so that the reaction can subsequently occur. The objective is for the alkaline activator to raise the amount of alkaline $Na^+$ and $K^+$ cations in the mixture. Moreover, among the effects of using alkaline activators are those summarized in FIGS. 2 and 3.

Figure 2:
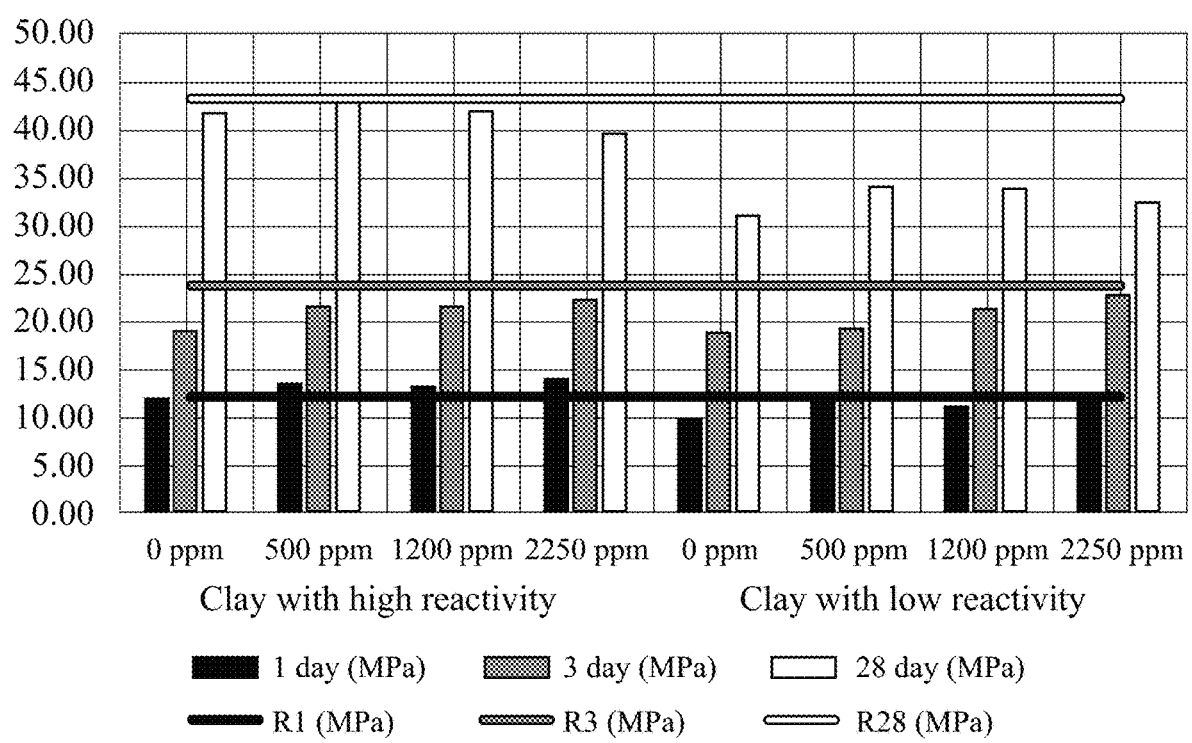
FIG. 2 illustrates the strength of clays with high and low reactivity as a function of the amount of alkali (alkaline activator) at 0 ppm, 500 ppm, 1200 ppm and 2250 ppm.
Figure 3:
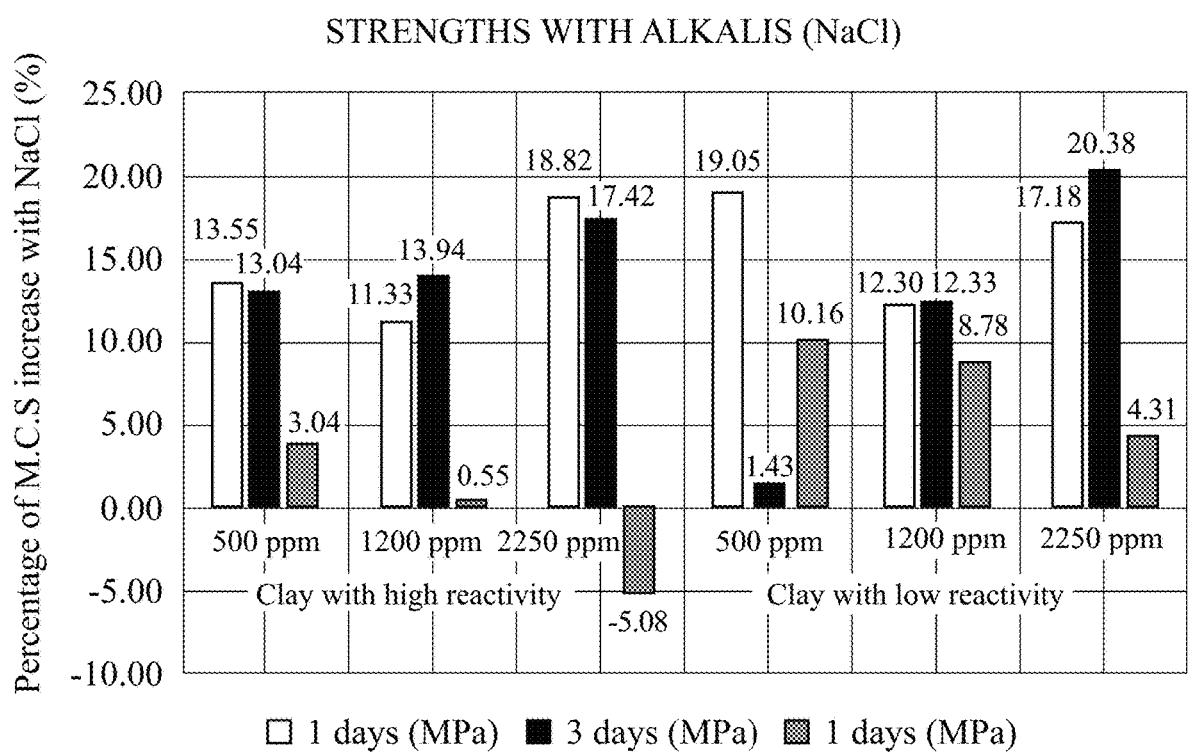
FIG. 3 shows the percentage increase in M.C.S. with NaCl for high and low reactivity clays at NaCl concentrations of 0 ppm, 500 ppm, 1200 ppm and 2250 ppm.
Figure 4:
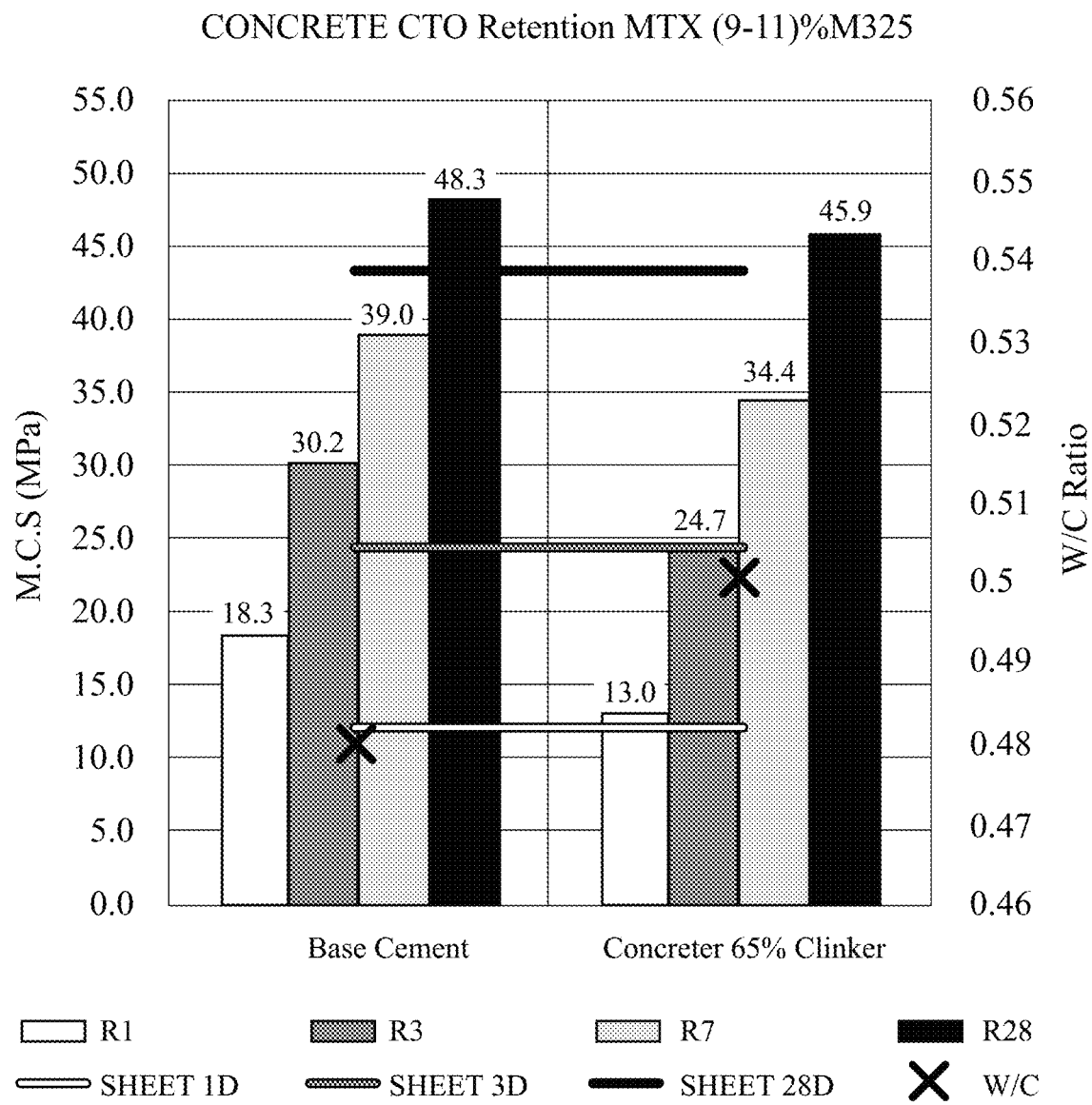
FIG. 4 shows the behavior in M.C.S. (MPa) and water/cement ratio (w/c) of a base cement (CC1) and a C1 concrete cement with 65% clinker and 35% pozzolanic mix at the ages of 1 day, 3, 7 and 28 days.
Figure 5:
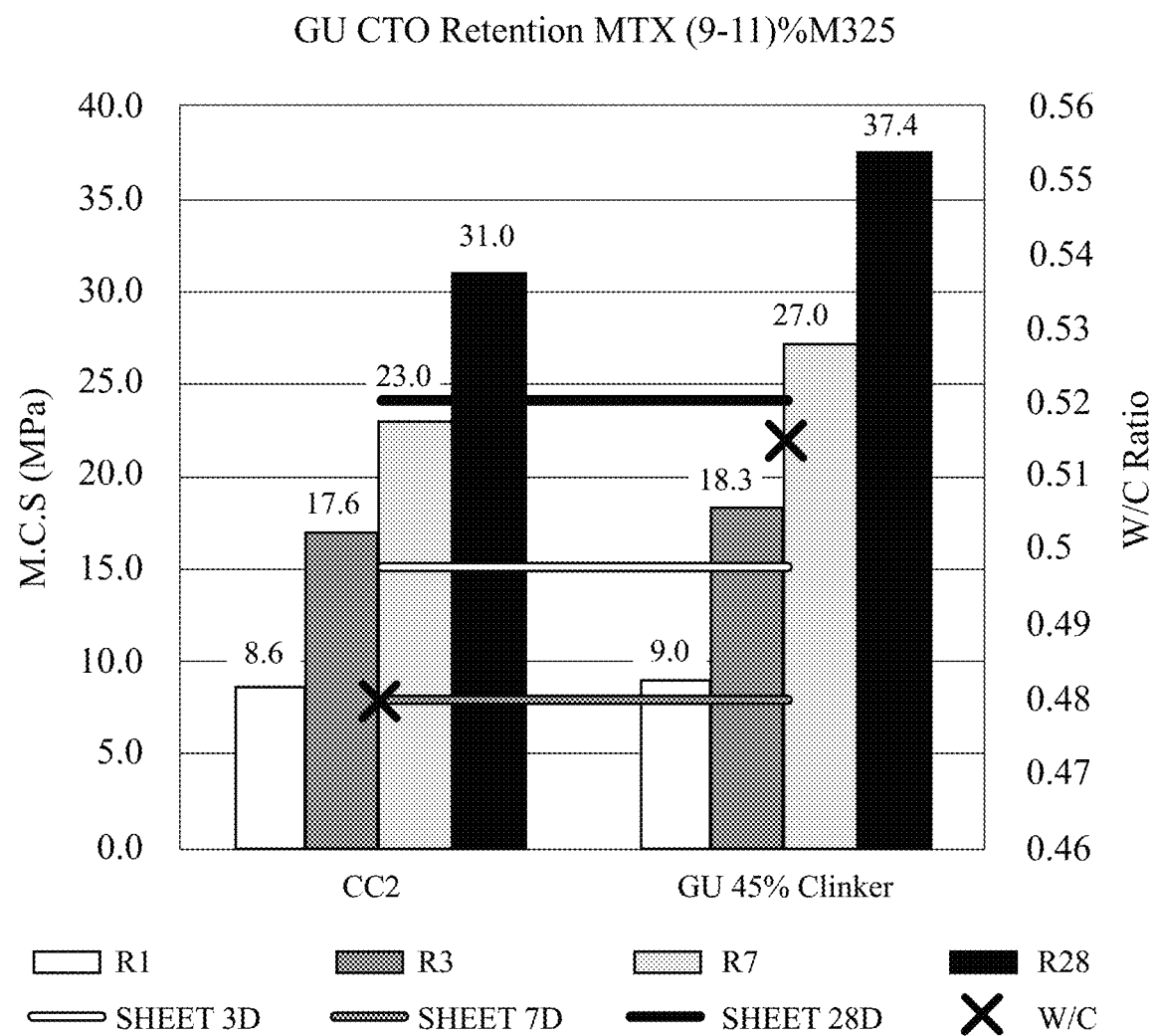
FIG. 5 shows the behavior in M.C.S. (MPa) and w/c ratio of a control cement CC2 and a cement for concrete production C2 with 45% clinker and 55% pozzolanic mix MP7 at the ages of 1 day, 3, 7 and 28 days.

First, FIG. 2 shows the mechanical strengths obtained at the ages of 1, 3 and 28 days for two mortars consisting of two calcined clays of different reactivity, among others, to which different proportions of NaCl were added as alkaline activator, 0, 500, 1200 and 2250 ppm, respectively. The influence of the activator on the increase in mechanical strength of all mortars at initial ages may be observed. Moreover, FIG. 3 shows a comparative study of the percentage increase in the compressive mechanical strengths of these same mortars at the aforesaid ages with the different proportions of the activating agent added.

Useful alkaline activators in the cementitious composition include, but are not limited to, sea salt, sodium hydroxide (NaOH), sodium chloride (NaCl), sodium sulfate ($Na_2SO_4$), sodium carbonate ($Na_2CO_3$), potassium hydroxide (KOH), potassium chloride (KCl), potassium sulfate ($K_2SO_4$) and/or combination thereof. However, another useful alkaline activator may also be used in the formulation of the pozzolanic mixture, according to the understanding of a person moderately versed in the matter. The alkaline activator is in the cementitious composition in an amount between 1 and 10%, between 0 and 0.7%, between 0 and 0.1%, between 0.1 and 0.3%, between 0.3 and 0.7%.

The cementitious composition also optionally comprises other components, additives or minerals that generally correspond to by-products of other processes or materials of vegetable origin, which may or may not be previously processed. Among possible components that are optionally added to the cementitious composition, there are: pozzolans, slag, mineral additions, fly ash, ground blast furnace slag, silica fume and natural pozzolans. Other materials include electrostatic precipitator dust, brick chips, limestone, among others. Among the additives, there are grinding additives (to facilitate the material fluidity), quality improvers, grinding improvers such as tertiary amines, TEA, TIPA, among others.

The cementitious composition is characterized in that it achieves mechanical compressive strengths at ages of 1 day: between 9.0 and 18.0 MPa, at 3 days: between 18.0 and 30.0 MPa, at 7 days: between 26.0 and 38.0 MPa, and at 28 days: between 37.0 and 50.0 MPa.

Concrete

The concrete or hydraulic concrete of the invention comprises a cementitious composition, a fine aggregate, a coarse aggregate and water.

Fine aggregate is concrete sand selected from natural sand, manufactured sand and/or a combination thereof, in accordance with ASTM C33. However, any other useful fine aggregate may also be used in concrete, as understood by a person moderately skilled in the art. Fine aggregate comprises a sand mixture of different natural sands and/or different manufactured sands with different physical characteristics. The fine aggregate used in the concrete of the present invention has a particle size of less than 4.75 mm, or one that passes through mesh number 4. The fine aggregate is inside the concrete in an amount between 1 and 60%, between 25 and 45%, between 30 and 40%, or between 34 and 36%.

Coarse aggregate is selected from, but not limited to, gravel, crushed gravel, crushed stone, granular slag, crushed concrete and/or combination thereof, in accordance with ASTM C33. However, another useful coarse aggregate may also be used in concrete, as understood by a person moderately versed in the subject. The coarse aggregate is found in concrete in an amount between 1 and 70%, between 20 and 60%, between 25 and 55%, between 35 and 50%, or between 38 and 45%.

The water used in the concrete formulation allows the hydraulic cement to hydrate, in order to develop strength and lubricate the particles to allow mixing, transport and application. In one embodiment, the water used in concrete is as described in ASTM C1602. The water is found in an amount between 1 and 20%, between 5 and 10%, between 4 and 9%, or between 5 and 8%. The amount of water used to formulate the concrete of the present application is a ratio to the selected cementitious composition between 0.3, 0.4, 0.5, 0.6 and 0.7, i.e., in a range between 0.3 and 0.7.

The cementitious composition of the concrete comprises a clinker, a setting regulator and a pozzolanic mix.

The clinker of the cementitious composition is defined as a binder or hydraulic conglomerate obtained from raw materials, such as limestone and clays from geological formations that are extracted, crushed, ground, mixed and kilned until they are obtained.

The cementitious composition of the present invention decreases by as much as 20% to 55% the clinker amount used in relation to Portland cement.

Preferably the mineralogical composition of the clinker used comprises C3S—Alite, C2S—beta—Belite, calcium oxide—lime, brownmillerite, C3A, C3A, magnesium oxide—periclase, potassium sulfate, beta—Arcanite. The clinker consists of a mixture of C3S and C2S silicates, C3A aluminates and C4AF calcium ferrite aluminate. The clinker has a C3S content greater than 50%, between 40 and 80%, or between 45 and 70%. The clinker has a C3A content greater than 2%, between 1 and 10%, or between 2 and 6.5%.

In the present invention the clinker is selected from OPC (Ordinary Portland Cement) clinker. However, another useful clinker may also be used in the cementitious composition, according to the understanding of a person averagely versed in the art. The clinker is in the cementitious composition in an amount between 35 and 80%, between 35 and 65%, between 40 and 50%, between 35 and 60%, between 55 and 35%, between 65 and 75%.

The cementitious composition also comprises a setting regulator, which is used to control the setting of the material, i.e., it ensures its workability for an optimum period of time.

The setting regulator is selected from calcium sulfate dihydrate ($CaSO_4.2H_2O$—gypsum), calcium sulfate hemihydrate ($CaSO_4.0.5H_2O$—basanite), calcium sulfate ($CaSO_4$—anhydrite), gypsum with $SO_4^{-2}$ anion, and/or a combination thereof. The setting regulator may be the same or different from the setting regulator of the pozzolanic mixture. However, another useful setting regulator may also be used, as understood by a person moderately skilled in the art. The setting regulator is in the cementitious composition in an amount between 1 and 10%, between 1 and 5%, between 3 and 6%, between 5 and 10%, or between 4 and 8%.

The cementitious composition comprises a pozzolanic mixture that is useful as a SCM, which comprises an activated clay, a limestone, and a setting regulator, as described below. The pozzolanic mixture is in the cementitious composition at least 20%, between 20 and 65%, between 20 and 60%, between 20 and 30%, between 30 and 40%, or between 40 and 60%.

For the purposes of the present invention, activated clay is understood to mean a clay that has been subjected to a thermal or chemical activation process, for example by calcination at a temperature between 550 and 850° C. Activated clay is also to be understood as "calcined clay". Clay (without being subjected to an activation process) comprises one or more of the following clay minerals: ilite, gibbsite, goethite, montmorillonite, illite, kaolinite, chlorite, micas, muscovite, halloysite, metahalloysite or mixtures thereof.

In one embodiment, the activated clay is a mixture of several activated clays with different characteristics, or an activated clay and one or more inactivated clays.

The activated clay of the present application is mineralogically wherein it comprises one or more of quartz, kaolinite-1A, mica (Muscovite 2-M1), mica (Illite-1M), vermiculite-2M, anatase, talc, microcline, albite, clinochlore-IIb-2, hematite, alpha hematite, pyrite and/or amorphous, and mixtures thereof. In particular, the activated clay is characterized in that it comprises quartz and amorphs, wherein the quartz is between 10 and 90% or between 20 and 76%, and wherein the amorphs are between 10 and 80%, between 20 and 80%, or between 20 and 70%. The activated clay used in the present invention may be a mixture of different calcined clays with different mineralogical and chemical characteristics.

Regarding the chemical composition of the activated clay, it has an $Al_2O_3$ content greater than 10%, between 10 and 50%, or between 15 and 30%. Moreover, the activated clay has an $Fe_2O_3$ content greater than 5%, between 1 and 60%, between 3 and 20%, or between 5 and 20%. The activated clay comprises other components, such as $SiO_2$, $Na_2O$ and $K_2O$.

Wherein, as a person moderately versed in the subject would understand the term LOI corresponds to loss on ignition (loss on ignition) which is determined by heating a sample with known mass at a temperature of 900° C. to 1000° C., until mass constancy is obtained. The mass loss of the sample is then determined. Normally, a large loss on ignition is an indication of pre-hydration (water content), organic compounds (NOx, SOx) and carbonation ($CO_2$), which may result from the material itself, from prolonged or improper storage, or from adulteration during transport. The calcination loss test of the examples was performed in accordance with ASTM C 114 (AASHTO T 105), COVENIN 0109, IRAM 1504, NCh147, NGO 41003 h18, NMX-C-151-ONNCCE, NTC 184, NTE 0160, NTP334.086 and UNIT-NM 18.

However, another useful calcined clay may also be used in the pozzolanic mixture developed, as understood by a person moderately versed in the matter. The activated clay is in the pozzolanic mixture in an amount between 10 and 90%, between 20 and 80%, between 50 and 80%, between 40 and 70%, between 20 and 85%, between 30 and 70%. The activated clay is in the cementitious composition in an amount between 1 and 50%, between 10 and 30%, between 10 and 25%, between 15 and 35%, between 15 and 45%, between 15 and 25%.

Activated clay with the characteristics highlighted in this document allows reducing the clinker/cement factor of any cement without affecting the performance of the resulting cement. Due to its high, fast and early pozzolanic activity, i.e., its fast reaction with the calcium hydroxide present in the system resulting from the hydration of Portland clinker, it offers differentiated results when compared to other SCM, obtaining for example performances at earlier ages than in the case of other SCM. An early pozzolanic activity means it is capable of producing cementitious compounds in synergy with cement hydration from the first days of hydration (1-3-7 days). It also makes it possible to formulate cements with high durability against Cl⁻ ion attack and against ASR (alkali-aggregate reaction).

On the other hand, limestone corresponds to a metamorphic rock composed mainly of calcite, forming marble; additionally, aragonite and secondary minerals such as wollastonite, graphite, chlorite, talc, mica, quartz, pyrite and some precious stones such as corundum, garnet or zirconite may appear. More particularly the limestone of the present invention is characterized by being a metamorphic limestone. The function of limestone in cement hydration may be dual. Without being a definitive theory, limestone participates chemically, by favoring the production of carboaluminates (Mono and Hemi), and physically, by promoting cement hydration through its filling effect in the pozzolanic mixture.

The limestone has an amount of more than 60% calcium carbonate ($CaCO_3$), at least 50% calcium carbonate ($CaCO_3$), between 70 and 80% or between 80 and 99% calcium carbonate. Preferably, the limestone used in the pozzolanic mixture has mainly CaO and LOI. Wherein CaO is at least 30%, between 10 and 70%, between 30 and 60%, between 40 and 60%, or between 30 and 56%. Wherein the LOI is at least 20%, between 20 and 70%, between 25 and 55%, between 30 and 50%, or between 20 and 45%.

However, the pozzolanic mix developed may comprise another useful limestone as understood by a person moderately skilled in the art. The limestone is in the pozzolanic mixture in an amount between 5 and 80%, between 20 and 75%, between 20 and 60%, between 45 and 60%, between 10 and 75%, between 15 and 60%. Limestone is in the cementitious composition in an amount between 1 and 40%, between 1 and 30%, between 5 and 30%, between 8 and 30%, or between 4 and 29%.

In one embodiment, the activated clay and limestone are in a ratio between 1:1 and 3:1, between 3:1 and 1:1.

Moreover, the setting regulator of the pozzolanic mix is used to delay or regulate the setting of the material, ensuring its workability for an optimum period of time. Thus, the regulator becomes important in large cement substitutions to guarantee the correct cement hydration.

For purposes of the present invention, the setting regulator is of natural or synthetic origin and it is selected from, but not limited to, calcium sulfate dihydrate ($CaSO_4.2H_2O$—gypsum), calcium sulfate hemihydrate ($CaSO_4.0.5H_2O$—basanite), calcium sulfate ($CaSO_4$—anhydrite), gypsum with $SO_4^{-2}$ anion and/or a combination thereof. However, another useful setting regulator may also be used in the pozzolanic mixture, as understood by a person moderately skilled in the art. The setting regulator is in the pozzolanic mixture in an amount between 1 and 20%, between 3 and 10%, between 3 and 8%, or between 3 and 15%. The setting regulator of the pozzolanic mixture is in the cementitious composition in an amount between 1 and 5%, between 2 and 3%, between 1 and 4%.

The pozzolanic mixture is found in suitable sizes for its implementation in cements or cementitious compositions. For this, a particle size reduction process may be carried out by grinding or crushing the mixture of activated clay, limestone and setting regulator. The pozzolanic mixture may also be obtained with activated clay, limestone and setting regulator previously ground individually. The pozzolanic mixture of the present application has a particle size less than 75 microns, between 44 and 75 microns, or less than 44 microns.

Moreover, the pozzolanic mixture has a Blaine specific surface area between 6500 and 10000 cm²/g, between 6500 and 7500 cm²/g, between 5000 and 10000 cm²/g.

Optionally, the cementitious composition comprises an alkaline activator, which is defined as a stimulant or accelerator in charge of generating a basic medium that allows the dissolution of all the cement phases, so the reaction may subsequently occur. The purpose is for the alkaline activator to raise the amount of alkaline Na⁺ and K⁺ cations in the mixture. Useful alkaline activators in the cementitious composition include, but are not limited, to sea salt, sodium hydroxide (NaOH), sodium chloride (NaCl), sodium sulfate ($Na_2SO_4$), sodium carbonate ($Na_2CO_3$), potassium hydroxide (KOH), potassium chloride (KCl), potassium sulfate ($K_2SO_4$) and/or combination thereof. However, another useful alkaline activator may also be used in the formulation of the pozzolanic mixture, according to the understanding of a person moderately versed in the matter. The alkaline activator is in the cementitious composition in an amount between 1 and 10%, between 0 and 0.7%, between 0 and 0.1%, between 0.1 and 0.3%, between 0.3 and 0.7%.

In addition, among the effects of using alkaline activators are those summarized in FIGS. 2 and 3. First, FIG. 2 shows the mechanical strengths obtained at ages of 1, 3 and 28 days for two mortars consisting, among others, of two calcined clays of different reactivity, to which different proportions of NaCl were added as alkaline activator, 0, 500, 1200 and 2250 ppm, respectively. The influence of the activator on the increase in mechanical strength of all mortars at initial ages may be observed. Moreover, FIG. 3 shows a comparative study of the percentage increase in the compressive mechanical strengths of these same mortars at the above-mentioned ages with the different proportions of the activating agent added.

Optionally, the concrete comprises additives, which include, but are not limited to, water reducers, retardants, accelerants, water reducers and accelerants, high-range water reducers, high-range water reducers and retardants, e.g., complying with regulation ASTM C494.

The concrete of the present invention is characterized in that it has a compressive strength at 3 days of: between 25 and 45 MPa (approximately 35 MPa), at 7 days of: between 45 and 65 MPa (approximately 55 MPa), at 28 days of:

between 55 and 75 MPa (approximately 65 MPa), at 56 days of: between 60 and 80 MPa (approximately 70 MPa), at 90 days of: between 65 and 85 MPa (approximately 75 MPa).

Moreover, the concrete has low water permeability (penetration depth <30 mm) and low chloride ion penetration (chloride ion penetration between 1000 and 2000 Coulombs measured at 56 days) evaluated according to NTC4483 and ASTM C1202, respectively.

EXAMPLES

The following Examples illustrate the invention, without the inventive concept being restricted thereto:

Example 1. Characterization of Some Raw Materials for the Pozzolanic Mixture (Activated Clay and Limestone)

TABLE 1

Mineralogical composition ranges of clays activated at temperatures of 550 and 750° C.

| | 550° C. | | 750° C. | |
|---|---|---|---|---|
| Mineral | Min. (%) | Max. (%) | Min. (%) | Max. (%) |
| Quartz | 20.1 | 70.5 | 25.1 | 75.5 |
| Kaolinite -1$^a$ | 0.0 | 5.0 | 0.0 | 0.0 |
| Mica (Muscovite 2-M1) | 0.9 | 30.0 | 0.0 | <1 |
| Mica (Illite-1M) | 0.0 | 1.9 | 0.0 | <1 |
| Vermiculite-2M | 0.0 | 6.8 | 0.0 | 1.23 |
| Anatase | 0.0 | 3.0 | 0.0 | 2.0 |
| Talc | 0.0 | 4.8 | 0.0 | 4.8 |
| Microcline | 0.0 | 5.0 | 0.0 | <1.01 |
| Albite | 0.0 | 1.1 | 0.0 | <1 |
| Chlinochloro-IIb-2 | 0.0 | 3.0 | 0.0 | <1 |
| Hematite | 0.0 | 1.9 | 0.0 | <1 |
| Alpha hematite | 0.0 | 1.2 | 0.0 | <1 |
| Pyrite | 0.0 | 1.5 | 0.0 | <1 |
| Amorphous | 20.0 | 60.0 | 30.0 | 70.0 |

TABLE 2

Chemical composition of activated clay random samples

| Sample No. | % SiO$_2$ | % Al$_2$O$_3$ | % Fe$_2$O$_3$ | % LOI | % Na$_2$O | % K$_2$O |
|---|---|---|---|---|---|---|
| AA1 | 64.35 | 21.15 | 9.51 | 2.28 | 0.15 | 1.16 |
| AA2 | 60.28 | 23.2 | 8.5 | 2.41 | 0.23 | 1.84 |
| AA3 | 56.19 | 23.32 | 15.18 | 0.57 | 0.21 | 1.41 |
| AA4 | 53.23 | 25.47 | 13.68 | 3.74 | 0.14 | 1.17 |
| AA5 | 61.52 | 21.6 | 11.38 | 2.61 | 0.26 | 0.8 |
| AA6 | 59.34 | 23.25 | 10.99 | 2.97 | 0.25 | 0.93 |
| AA7 | 72.14 | 18.15 | 6.72 | 0.35 | 0.19 | 1.07 |
| AA8 | 68.62 | 19.61 | 7.63 | 0.12 | 0.15 | 1.98 |
| AA9 | 72.93 | 18.04 | 6.47 | 0.34 | 0.3 | 2.18 |
| AA10 | 69.35 | 19.39 | 7.22 | 0.82 | 0.18 | 3.14 |
| AA11 | 73.13 | 17.17 | 6.77 | 0.45 | 0.22 | 2.51 |
| AA12 | 72.53 | 17.76 | 6.49 | 0.75 | 0.19 | 2.51 |

The calcined clay after grinding presented on average a Blaine (m$^2$/g) of 1767 and a d$_{50}$ of 5 (μm).

TABLE 3

Chemical composition range of limestones used in the pozzolanic mixtures of the application

| Compounds | Minimum (%) | Maximum (%) |
|---|---|---|
| SiO$_2$ | 0 | 20 |
| Al$_2$O$_3$ | 0 | 8 |

TABLE 3-continued

Chemical composition range of limestones used in the pozzolanic mixtures of the application

| Compounds | Minimum (%) | Maximum (%) |
|---|---|---|
| Fe$_2$O$_3$ | 0 | 8 |
| CaO | 40 | 56 |
| MgO | 0 | 22 |
| SO$_3$ | 0 | 5 |
| NaO$_2$ | 0 | 2 |
| K$_2$O | 0 | 2 |
| Cr$_2$O$_3$ | 0 | 1 |
| MnO | 0 | 1 |
| P$_2$O$_5$ | 0 | 1 |
| TiO$_2$ | 0 | 1 |
| LOI | 30 | 45 |
| CaCO$_3$ | 60 | 100 |

Example 2. Activated Clay—Limestone Mixtures and Pozzolanic Mixture Formulation

Different formulations were made with different proportions of activated clay/limestone and their mechanical performance was evaluated. The activated clay evaluated corresponds to a low-grade clay calcined in an industrial rotary kiln at a calcination temperature between 750 and 850° C., with a kaolin content close to 48% and accompanying minerals such as muscovite and quartz. The limestone tested was a siliceous limestone with more than 75% calcium carbonate. Subsequently, the clay and limestone were ground until passing through a sieve, obtaining between 3 and 4% retained in 325 mesh.

Different ratios of activated clay/limestone in standard mortar, prepared with 80% (w/w) of the reference cement (Ref. Cement) and 20% (w/w) of a limestone clay ratio (3-1, 2-1, 1-1, 1-2, 1-3) per total mass of the cementitious material, were characterized. Mechanical compressive strengths were determined at ages 3, 7 and 28 days, as shown below:

TABLE 4

Activated clay/limestone sample formulations

| | | | | Compressive strength (MPa) | | |
|---|---|---|---|---|---|---|
| Sample No. | AC | w/c | Flow (%) | 3 days | 7 days | 28 days |
| Ref Cement | 100% cement | 0.5 | 106.4 | 32.5 | 39.8 | 48.9 |
| M1 | 1:3 | 0.5 | 114.4 | 22.3 | 28.0 | 36.3 |
| M2 | 1:2 | 0.5 | 112.8 | 23.7 | 29.5 | 37.0 |
| M3 | 1:1 | 0.5 | 105.6 | 24.9 | 31.6 | 39.8 |
| M4 | 2:1 | 0.5 | 114.4 | 23.3 | 30.6 | 40.6 |
| M5 | 3:1 | 0.5 | 114.4 | 23.8 | 31.7 | 39.6 |

The determination of the mechanical compressive strength at ages 3, 7 and 28 days was carried out according to ASTM C109 (NTC220), using three 5×5×5 cm specimens for each sample and age of mortar. It is observed in FIG. 1 and Table 1 that, for the 3-day age, sample M3 (of AC 1:1), and, for the 7-day age, sample M5, gave better results.

In order to evaluate the performance of the pozzolanic mix versus the activated clay and limestone mix, MP6 was compared with the reference cement and mixes M1 to M5 (the corresponding values for flow and compressive strength in Table 6 for M1 to M5 are the same values reported in Table 4):

TABLE 5

Composition of pozzolanic mixtures MP6

| Sample No. | AA (%) | Limestone (%) | Gypsum (%) |
|---|---|---|---|
| MP6 | 47.5 | 47.5 | 5.0 |

TABLE 6

Mechanical performance for 5 samples where the activated clay/limestone (AC) ratio is varied.

| | | Compressive strength (MPa) | | | Blaine |
|---|---|---|---|---|---|
| Sample No. | Flow (%) | 3 days | 7 days | 28 days | cm²/g |
| 100% Cement | 106.4 | 32.5 | 29.8 | 48.9 | — |
| M1 | 114.4 | 21.4 | 28.1 | 36.7 | 585.46 |
| M2 | 110.5 | 22.7 | 28.3 | 37.3 | 872.96 |
| M3 | 109.0 | 23.9 | 30.1 | 39.1 | 940.37 |
| M4 | 113.1 | 23.4 | 28.8 | 40.9 | 1033.06 |
| M5 | 111.9 | 23.2 | 30.0 | 40.6 | 1089.55 |
| MP6 | 108.4 | 24.3 | 31.9 | 38.6 | 955.00 |

Table 6 allows comparing similar proportions of limestone clay (M3) with sulfate-adjusted MP6. The results obtained with MP6 show higher compressive strengths at 3 and 7 days compared to the limestone-clay mixtures.

Example 3. Characterization of the Clinker Used in the Cementitious Composition

TABLE 7

Mineralogical composition of 5 random clinker samples

| Parameter | CL1 | CL2 | CL3 | CL4 | CL5 |
|---|---|---|---|---|---|
| C3S - Alita, Nishi et al % | 62.82 | 64.29 | 50.64 | 69.7 | 60.1 |
| C2S - beta - Belite (Mumme) % | 14.68 | 14.43 | 23.47 | 7.3 | 13.2 |
| Calcium oxide - lime % | 0.59 | 0 | 3.68 | 0 | 2.86 |
| Brownmillerite (2/1.52/0.48/5) % | 8.77 | 10.66 | 10.62 | 13.93 | 14.58 |
| C3A - Cubic Aluminate % | 3.07 | 2.49 | 2.54 | 0.9 | 2.3 |
| C3A - Na-orto aluminato, NIST % | 2.95 | 1.56 | 2.49 | 1.4 | 1.1 |
| C3A total | 6.02 | 4.05 | 5.03 | 2.3 | 3.4 |
| Magnesium oxide - Periclase % | 0.71 | 0.7 | 0.56 | 0.57 | 0.61 |
| Potassium sulfate, beta - Arcanite % | 1.92 | 1.38 | 1.5 | 0.6 | 0 |

Example 4. Cementitious Compositions with Alkaline Activator

Cementitious compositions C14 to C21 were made using the pozzolanic mixtures MP7 and MP8 and a clinker with the mineralogical characteristics described in Example 3, in order to evaluate the mechanical performance of the cementitious composition in relation to the amount of alkaline activator, as illustrated in Table 10 and FIGS. 2 and 3.

TABLE 8

Pozzolanic mixtures compositions MP7 and MP8

| Sample No. | AA (%) | Limestone (%) | Gypsum (%) |
|---|---|---|---|
| MP7 | 45.2 | 45.2 | 9.6 |
| MP8 | 45.2 | 45.2 | 9.6 |

TABLE 9

Cementitious compositions with alkaline activator

| | CL | Gypsum | Pozzolanic mixture | | Alkaline |
|---|---|---|---|---|---|
| Sample No. | (%) | (%) | Sample No. | (%) | activator (%) |
| C14 | 65.00 | 3.42 | MP7 | 31.58 | 0.000 |
| C15 | 64.99 | 3.42 | MP7 | 31.54 | 0.050 |
| C16 | 64.95 | 3.41 | MP7 | 31.52 | 0.120 |
| C17 | 64.90 | 3.40 | MP8 | 31.45 | 0.250 |
| C18 | 65.00 | 3.42 | MP7 | 31.58 | 0.000 |
| C19 | 64.99 | 3.42 | MP7 | 31.54 | 0.050 |
| C20 | 64.95 | 3.41 | MP7 | 31.52 | 0.120 |
| C21 | 64.90 | 3.40 | MP8 | 31.45 | 0.250 |

TABLE 10

Properties and results of cementitious compositions with pozzolanic mixtures MP7 and MP8

| | | | Compressive strength [MPa] | | |
|---|---|---|---|---|---|
| Sample No. | w/c | Flow (%) | 1 day | 3 days | 28 days |
| C14 | 0.5 | 106.2 | 11.8 | 18.9 | 41.7 |
| C15 | 0.5 | 106.2 | 13.4 | 21.4 | 43.4 |
| C16 | 0.5 | 106.2 | 13.1 | 21.6 | 42 |
| C17 | 0.5 | 106.2 | 14 | 22.2 | 39.6 |
| C18 | 0.485 | 107.3 | 9.9 | 18.9 | 31.1 |
| C19 | 0.485 | 107.3 | 11.8 | 19.2 | 34.3 |
| C20 | 0.485 | 107.3 | 11.1 | 21.2 | 33.8 |
| C21 | 0.485 | 107.3 | 11.6 | 22.7 | 32.5 |

Example 5. Cementitious Compositions as Effect of the Setting Regulator

Cementitious compositions C11 to C13 and C22 to C27 were made using pozzolanic mixtures MP9 to MP17 and a clinker with the mineralogical characteristics described in Example 3, in order to evaluate different amounts of setting regulator in both the pozzolanic mixture and the cementitious composition and their effect on the mechanical performance of the resulting cementitious composition, as illustrated in Table 13.

TABLE 11

Compositions of pozzolanic mixtures MP9 to MP17 wherein the amount of setting regulator is varied

| Sample No. | AA (%) | Limestone (%) | Gypsum (%) |
|---|---|---|---|
| MP9 | 46.7 | 46.7 | 6.6 |
| MP10 | 47.5 | 47.5 | 5.0 |
| MP11 | 48.3 | 48.3 | 3.4 |
| MP12 | 45.2 | 45.2 | 9.6 |
| MP13 | 44.8 | 44.8 | 10.4 |
| MP14 | 44.2 | 44.2 | 11.6 |
| MP15 | 45.2 | 45.2 | 9.6 |
| MP16 | 44.8 | 44.8 | 10.4 |
| MP17 | 44.3 | 44.3 | 11.4 |

TABLE 12

Cementitious compositions using the pozzolanic mixtures MP9 to MP17, where the amount of setting regulator is varied

| Sample No. | CL (%) | Gypsum (%) | Pozzolanic mixture Sample No. | (%) |
|---|---|---|---|---|
| C11 | 45.00 | 2.37 | MP9 | 52.63 |
| C12 | 45.00 | 2.37 | MP10 | 52.63 |
| C13 | 45.00 | 2.37 | MP11 | 52.63 |
| C22 | 65.00 | 3.42 | MP12 | 31.58 |
| C23 | 65.00 | 3.42 | MP13 | 31.58 |
| C24 | 65.00 | 3.42 | MP14 | 31.58 |
| C25 | 65.00 | 3.42 | MP15 | 31.58 |
| C26 | 65.00 | 3.42 | MP16 | 31.58 |
| C27 | 65.00 | 3.42 | MP17 | 31.58 |

Cementitious compositions C11 to C13 have a lower clinker amount and a higher amount of pozzolanic mixture versus cementitious compositions C22 to C27.

TABLE 13

Properties and results of cementitious compositions with pozzolanic mixtures MP9 to MP17.

| Sample No. | w/c | Flow (%) | Compressive strength (MPa) | | | |
|---|---|---|---|---|---|---|
| | | | 1 day | 3 days | 7 days | 28 days |
| C11 | 0.510 | 108.5 | 6.3 | 14.1 | 19.9 | 24.1 |
| C12 | 0.500 | 107.5 | 7.6 | 14.5 | 22.4 | 25.4 |
| C13 | 0.510 | 111.3 | 7.8 | 14.5 | 22.7 | 26.3 |
| C22 | 0.495 | 112.9 | 10.9 | 22.1 | 33.6 | 46.3 |
| C23 | 0.490 | 108.0 | 9.5 | 22.5 | 33.3 | 46.9 |
| C24 | 0.490 | 107.3 | 10.9 | 22.8 | 34.1 | 47.6 |
| C25 | 0.495 | 112.9 | 11.7 | 22.3 | 28.4 | 34.9 |
| C26 | 0.490 | 108.0 | 10.7 | 24.5 | 29.5 | 38.4 |
| C27 | 0.490 | 107.3 | 11.3 | 25.2 | 28.7 | 39.2 |

TABLE 14

Additional properties of cementitious compositions with pozzolanic mixtures MP9 to MP11.

| Sample No. | Density (g/cm$^3$) | Retained material (%) mesh 325 | BSS (cm$^2$/g) | PSD <3 microns | PSD 3-30 microns | PSD <45 microns |
|---|---|---|---|---|---|---|
| C11 | 2.9 | 8.3 | 499.0 | 29% | 65% | 99% |
| C12 | 2.9 | 9.6 | 560.3 | 29% | 64% | 99% |
| C13 | 2.9 | 8.9 | 562.4 | 29% | 64% | 99% |

TABLE 15

Normal consistency and setting for samples C11 to C13.

| Sample No. | Normal consistency (%) | Start of setting (min) | End of setting (min) |
|---|---|---|---|
| C11 | 29.0 | 143.0 | 255.0 |
| C12 | 28.5 | 128.0 | 240.0 |
| C13 | 29.0 | 135.0 | 240.0 |

All the proposed dosages shown in Table 13 comply with all the physical and mechanical-resistant specifications required for each type of cement (Tables 13-15), i.e.: concrete cement, structural cement or general use cement.

Example 6. Cementitious Compositions for Concrete Production

Cementitious compositions C1, C3, C5, C8 and C9 were prepared using pozzolanic mixtures MP18 to MP22 and a clinker with the mineralogical characteristics described in Example 3, in order to produce cements with the necessary characteristics for the production of concrete. This type of cement is specially designed for the industrialized production of concrete that offers greater efficiency and high strength development at initial and final ages, meeting the specifications of Colombian technical standard NTC 121 (type ART).

TABLE 16

Compositions of pozzolanic mixtures MP18 to MP22

| Sample No. | AA (%) | Limestone (%) | Gypsum (%) |
|---|---|---|---|
| MP18 | 45.8 | 45.8 | 8.4 |
| MP19 | 44.0 | 44.0 | 12.0 |
| MP20 | 59.0 | 31.0 | 10.0 |
| MP21 | 31.9 | 64.9 | 3.2 |
| MP22 | 64.9 | 31.9 | 3.2 |

TABLE 17

Cementitious materials compositions for concrete production

| Sample No. | CL (%) | Gypsum (%) | Pozzolanic mixture Sample No. | (%) | Alkaline activator (%) |
|---|---|---|---|---|---|
| CC1 | 84.90 | — | — | — | — |
| C1 | 64.95 | 3.42 | MP18 | 31.545 | 0.085 |
| C3 | 74.95 | 3.93 | MP19 | 21.12 | 0.0 |
| C5 | 75.00 | 3.95 | MP20 | 21.05 | 0.0 |
| C8 | 70.00 | 3.68 | MP21 | 26.32 | 0.0 |
| C9 | 70.00 | 3.68 | MP22 | 26.32 | 0.0 |

TABLE 18

Properties and results of cementitious compositions with pozzolanic mixtures MP18 to MP22.

| Sample No. | w/c | Flow (%) | Compressive strength (MPa) | | | |
|---|---|---|---|---|---|---|
| | | | 1 day | 3 days | 7 days | 28 days |
| CC1 | 0.480 | | 15.7 | 31.1 | 38.8 | 46.1 |
| C1 | 0.500 | 108.7 | 13.0 | 24.7 | 34.4 | 46.0 |
| C3 | 0.500 | 109.1 | 14.4 | 26.4 | 33.3 | 45.6 |
| C5 | — | — | 16.4 | 29.2 | 37.3 | 48.1 |
| C8 | 0.460 | 105.6 | 14.7 | 23.4 | 31.4 | 43.4 |
| C9 | 0.485 | 109.2 | 13.3 | 25.0 | 35.3 | 49.4 |

The results in Table 18 show it is possible to obtain cements including the pozzolanic mix with performances similar to high early strength industrial cements by reducing the clinker content by up to 15%.

TABLE 19

Additional properties of cementitious compositions with pozzolanic mixtures MP18 to MP20.

| Sample No. | Density (g/cm³) | Retained material (%) mesh 325 | AST BSS (cm²/g) | AST BET (m²/g) | PSD <3 microns | PSD 3-30 microns | PSD <45 microns |
|---|---|---|---|---|---|---|---|
| CC1 | 3.13 | 0.3 | 4432 | — | — | — | — |
| C1 | 3.01 | 4.00 | 4793 | 2.39 | 0.234 | 0.751 | 1.00 |
| C3 | 2.98 | 3.05 | 4851 | — | 0.273 | 0.716 | 1.00 |
| C5 | 3.07 | — | 5076 | 2.82 | 0.2197 | 0.7646 | 1.00 |

Compared to the reference cement, the greatest changes are observed in Blaine fineness and retention.

TABLE 20

Normal consistency and setting for samples CC1, C1, C3 and C5.

| Sample No. | Normal consistency (%) | Start of setting (min) | End of setting (min) |
|---|---|---|---|
| CC1 | 27 | 117 | 220 |
| C1 | 29 | 112 | 220 |
| C3 | 28 | 104 | 280 |
| C5 | 28 | 107 | 210 |

Cements that include the pozzolanic mix have shorter time of setting that are within the normal variations of cements.

Example 7. Cementitious Compositions for the Production of General Use (GU) Cement C2, C6 and C7 cementitious compositions were made using pozzolanic mixtures MP23 to MP25 and a clinker with the mineralogical characteristics described in Example 3, in order to produce cements with the characteristics of general use cement. The general use cement corresponds to a cement that complies with the characteristics of the American technical standard ASTM C 1157 type GU. Similarly, a C10 cementitious composition is produced using the pozzolanic mixture MP26 and a clinker with the mineralogical characteristics described in Example 3, in order to produce a masonry cement in accordance with the American technical standard ASTM C 91.

TABLE 21

Compositions of pozzolanic mixtures MP23 to MP26

| Sample No. | AA (%) | Limestone (%) | Gypsum (%) |
|---|---|---|---|
| MP23 | 46.6 | 46.6 | 6.8 |
| MP24 | 31.1 | 61 | 7.9 |
| MP25 | 69.1 | 23 | 7.9 |
| MP26 | 24 | 71 | 5 |

TABLE 22

Cementitious compositions with pozzolanic mixtures MP23 to MP26 and control cementitious composition 2 (CC2)

| Sample No. | CL (%) | Gypsum (%) | Pozzolanic mixture Sample No. | Pozzolanic mixture (%) | Alkaline activator (%) |
|---|---|---|---|---|---|
| CC2 | 55.50 | — | — | — | — |
| C2 | 44.95 | 2.365 | MP23 | 52.60 | 0.085 |
| C6 | 50.00 | 2.63 | MP24 | 47.37 | 0.0 |
| C7 | 50.00 | 2.63 | MP25 | 47.37 | 0.0 |
| C10 | 43.00 | 2.26 | MP26 | 54.74 | 0.0 |

TABLE 23

Properties and compressive strength results of cementitious compositions with pozzolanic blends MP23 to MP26, and control cementitious composition 2 (CC2)

| Sample No. | w/c | Flow [%] | Compressive strength [MPa] 1 day | 3 days | 7 days | 28 days |
|---|---|---|---|---|---|---|
| CC2 | 0.480 | — | 8.6 | 17.0 | 23.0 | 31.0 |
| C2 | 0.515 | 106.4 | 9.0 | 18.3 | 27.0 | 37.4 |
| C6 | 0.480 | 108.5 | 8.3 | 14.6 | 21.2 | 34.6 |
| C7 | 0.510 | 106.3 | 9.4 | 16.5 | 27.9 | 41.4 |
| C10 | 0.490 | — | — | — | 13.0 | 15.8 |

Table 23 shows how the use of the pozzolanic mix in conjunction with an alkaline activator reduces the clinker amount in general use cement from 55.5% to 45% for cements with pozzolanic mixes, obtaining similar mechanical performance. For its part, C10 cement represents the opportunity to use the pozzolanic mix in applications such as masonry.

TABLE 24

Additional properties of cementitious compositions with CC2 and C2 pozzolanic mixtures.

| Sample No. | Density (g/cm³) | Retained material (%) mesh 325 | AST BSS (cm²/g) | AST BET (m²/g) | PSD <3 microns | PSD 3-30 microns | PSD <45 microns |
|---|---|---|---|---|---|---|---|
| CC2 | — | 3.49 | 4576 | — | — | — | — |
| C2 | 2.93 | 6.10 | 5574 | 3.55 | 0.292 | 0.684 | 1.000 |

Table 24 allows comparing physical properties of the cements. It is noticed that cements with pozzolanic mixes have higher Blaine and may be cements with higher retained material, which translates into an opportunity for milling optimization.

TABLE 25

Normal consistency and setting for samples CC2 and C2

| Sample No. | Normal consistency (%) | Start of setting (min) | End of setting (min) |
|---|---|---|---|
| CC2 | 26 | 146 | 250 |
| C2 | 30 | 147 | 253 |

The setting for the general use reference cement vs. cement with 45% clinker, pozzolanic mix and activator indicate that these pozzolanic cements have no major impact on setting time.

Example 8. Cementitious Compositions for Structural Cement Production

C4 cementitious composition was prepared using the pozzolanic mixture MP27 and a clinker with the mineralogical characteristics described in Example 3, in order to produce cements with the characteristics of structural cement. Structural cement corresponds to a special cement for the production of structural concrete, such as those for columns, beams, slabs, walls and foundations in all types of buildings and infrastructure works, which meet the specifications of Colombian technical standard NTC 121 and American standard ASTM C-1157 type GU.

TABLE 26

Composition of pozzolanic mixture MP27

| Sample No. | AA (%) | Limestone (%) | Gypsum (%) |
|---|---|---|---|
| MP27 | 46 | 46 | 8.0 |

TABLE 27

Cementitious composition with pozzolanic mixture MP27 and control cementitious composition 3 (CC3)

| Sample No. | CL (%) | Gypsum (%) | Pozzolanic mixture (%) | Alkaline activator (%) |
|---|---|---|---|---|
| CC3 | 77.00 | — | — | — |
| C4 | 60.00 | 3.16 | 36.74 | 0.100 |

TABLE 28

Properties and results of cementitious composition with pozzolanic mixture MP27 and control cementitious composition 3 (CC3)

| Sample No. | w/c | Flow [%] | Compressive strength [MPa] | | | |
|---|---|---|---|---|---|---|
| | | | 1 day | 3 days | 7 days | 28 days |
| CC3 | — | — | 13.0 | 23.7 | 31.6 | 42.4 |
| C4 | 0.5 | 109 | 12.4 | 19.6 | 30.7 | 38.2 |

TABLE 29

Additional properties for the sample C4

| Sample No. | Density (g/cm³) | Retained material (%) mesh 325 | AST BSS (cm²/g) | AST BET (m²/g) | PSD <3 microns | PSD 3-30 microns | PSD <45 microns |
|---|---|---|---|---|---|---|---|
| C4 | 3.01 | — | 4645 | 2.52 | 0.2259 | 0.7353 | 1 |

TABLE 30

Normal consistency and setting for sample C4

| Sample No. | Normal consistency (%) | Start of setting (min) | End of setting (min) |
|---|---|---|---|
| C4 | 29 | 130 | 240 |

Example 9. Application of the Cementitious Composition with Pozzolanic Mix in Concrete The cementitious composition C4 was made using the pozzolanic mixture MP27 and a clinker with the mineralogical characteristics described in Example 3, in order to produce concrete.

TABLE 31

Compositions of pozzolanic mixtures MP28 to MP30.

| Sample No. | AA (%) | Limestone (%) | Gypsum (%) |
|---|---|---|---|
| MP28 | 47.62 | 47.62 | 4.76 |
| MP29 | 59.26 | 37.04 | 3.70 |
| MP30 | 64.55 | 32.28 | 3.17 |

The following concretes are characterized by having fine aggregates between 34 and 36% (w/w), coarse aggregates between 38 and 45% (w/w), water between 5 and 8%, and the following cementitious composition:

TABLE 32

Cementitious compositions with pozzolanic mixtures MP28 to MP30, used in CN1 to CN3 and control concrete (CNC1)

| Sample No. | CL (%) | Gypsum (%) | MCS Sample No. | MCS (%) |
|---|---|---|---|---|
| CN1 | 75.05 | 3.95 | MP28 | 21.00 |
| CN2 | 69.35 | 3.65 | MP29 | 27.00 |
| CN3 | 65.55 | 3.45 | MP30 | 31.00 |
| CNC1 | 69.35 | 3.65 | MCS1 | 27.00 |

CNC1 concrete has the following SCM1 composition: limestone 10%, fly ash 16% and gypsum 1%.

TABLE 33

Performance test results for concrete CN1, CN2 and CN3.

| Sample No. | Compressive strength (MPa) | | | | |
|---|---|---|---|---|---|
| | 3 days | 7 days | 28 days | 56 days | 90 days |
| CN1 | 41.4 | 58.5 | 67.7 | 73.0 | 78.7 |
| CN2 | 40.1 | 54.4 | 68.8 | 72.0 | 74.5 |
| CN3 | 29.1 | 50.4 | 61.9 | 64.5 | 65.9 |
| CNC1 | 36.4 | 50.9 | 64.4 | 70.3 | 73.8 |

TABLE 34

Durability results of concretes CN1 to CN3

| Sample No. | Durability | |
|---|---|---|
| | Water permeability | Chloride Ion Penetration |
| CN1 | Low | Low |
| CN2 | Low | Low |
| CN3 | Low | Low |

The results show that at equal levels of pozzolanic mix inclusion and SCM substitution (CN2 and CNC1) with the inclusion of Calcined Clays compared to an addition such as Fly Ash, higher strengths are achieved at early ages (3 and 7 days), strength evolution curves and values at very similar late ages. Moreover, the results of durability tests show low water permeability and chloride ion penetration, which means concretes that may be subjected to demanding exposure environments.

TABLE 35

Summary of the different cementitious compositions tested in Examples 1 to 8.

| Sample No. | CL (%) | Pozzolanic mixture components | | | | | Alkaline activator (%) | Total gypsum (%) |
|---|---|---|---|---|---|---|---|---|
| | | Gypsum (%) | AA (%) | Limestone (%) | Gypsum (%) | Pozzolanic mixture (%) | | |
| CC1 | 84.90 | — | — | — | — | — | — | 6.10 |
| C1 | 64.95 | 3.42 | 14.45 | 14.45 | 2.65 | 32% | 0.085 | 6.07 |
| CC2 | 55.50 | — | — | — | — | — | — | 5.50 |
| C2 | 44.95 | 2.37 | 24.51 | 24.51 | 2.15 | 53% | 0.085 | 5.94 |
| C3 | 74.95 | 3.93 | 9.29 | 9.29 | 3.79 | 21% | — | 6.46 |
| CC3 | 77.00 | — | — | — | — | — | — | 5.00 |
| C4 | 60.00 | 3.16 | 16.90 | 16.90 | 2.52 | 37% | 0.100 | 6.10 |
| C5 | 75.00 | 3.95 | 12.42 | 6.53 | 3.15 | 21% | — | 6.05 |
| C6 | 50.00 | 2.63 | 14.73 | 28.90 | 2.49 | 47% | — | 6.37 |
| C7 | 50.00 | 2.63 | 32.73 | 10.90 | 2.49 | 47% | — | 6.37 |
| C8 | 70.00 | 3.68 | 8.40 | 17.08 | 1.01 | 26% | — | 4.53 |
| C9 | 70.00 | 3.68 | 17.08 | 8.40 | 1.01 | 26% | — | 4.53 |
| C10 | 43.00 | 2.26 | 13.14 | 38.87 | 1.58 | 55% | — | 5.00 |
| C11 | 45.00 | 2.37 | 24.58 | 24.58 | 2.08 | 53% | — | 5.84 |
| C12 | 45.00 | 2.37 | 25.00 | 25.00 | 1.58 | 53% | — | 5.00 |
| C13 | 45.00 | 2.37 | 25.42 | 25.42 | 1.07 | 53% | — | 4.16 |
| C14 | 65.00 | 3.42 | 23.79 | 23.79 | 3.03 | 53% | 0.000 | 8.47 |
| C15 | 64.99 | 3.42 | 14.26 | 14.26 | 3.03 | 32% | 0.050 | 6.45 |
| C16 | 64.95 | 3.41 | 14.25 | 14.25 | 3.03 | 32% | 0.120 | 6.44 |
| C17 | 64.90 | 3.40 | 14.22 | 14.22 | 3.03 | 31% | 0.250 | 6.42 |
| C18 | 65.00 | 3.42 | 14.27 | 14.27 | 3.03 | 32% | 0.000 | 6.45 |
| C19 | 64.99 | 3.42 | 14.26 | 14.26 | 3.03 | 32% | 0.050 | 6.45 |
| C20 | 64.95 | 3.41 | 14.25 | 14.25 | 3.03 | 32% | 0.120 | 6.44 |
| C21 | 64.90 | 3.40 | 14.22 | 14.22 | 3.03 | 31% | 0.250 | 6.42 |
| C22 | 65.00 | 3.42 | 14.27 | 14.27 | 3.03 | 32% | — | 6.45 |
| C23 | 65.00 | 3.42 | 14.15 | 14.15 | 3.28 | 32% | — | 6.71 |
| C24 | 65.00 | 3.42 | 13.96 | 13.96 | 3.66 | 32% | — | 7.08 |
| C25 | 65.00 | 3.42 | 14.27 | 14.27 | 3.03 | 32% | — | 6.45 |
| C26 | 65.00 | 3.42 | 14.15 | 14.15 | 3.28 | 32% | — | 6.71 |
| C27 | 65.00 | 3.42 | 13.99 | 13.99 | 3.60 | 32% | — | 7.02 |

Definitions and Acronyms

AA Activated Clay.
M Mixture of activated clay and limestone.
AC Activated clay:limestone ratio
w/c Water/Cement Ratio
MP Pozzolanic mixture.
C Cementitious composition.
CC Cementitious Composition Control.
CL Clinker.
PSD Particle Size Distribution.
BSS Blaine Specific Surface Area.
TSA Total Surface Area.
GU General use cement.
CNC Concrete Control.
CN Concrete.
SCM Supplementary Cementitious Materials
LOT Loss on ignition/Loss on fire
M.C.S. Mechanical compressive Strength The present invention is not limited to the embodiments described and illustrated above, for as it will be evident to a person skilled in the art, there are possible variations and modifications which do not depart from the invention spirit, which alone is defined by the following claims.

The invention claimed is:

1. A pozzolanic mixture consisting essentially of:
   an activated clay between 20 and 85% (w/w)
   a limestone between 10 and 75% (w/w); and
   a pozzolanic mixture setting regulator between 3 and 15% (w/w).

2. The pozzolanic mixture of claim 1, wherein the activated clay has a mineralogical composition comprising quartz between 20 and 76%, and amorphous between 20 and 70%.

3. The pozzolanic mixture of claim 1, wherein the activated clay has a chemical composition with a content of $Al_2O_3$ between 10% and 50%, and $Fe_2O_3$ between 1 and 60%.

4. The pozzolanic mixture of claim 1, wherein the limestone is a metamorphic limestone.

5. The pozzolanic mixture of claim 1, wherein the limestone has a content of between 60% to 99% calcium carbonate.

6. The pozzolanic mixture of claim 1, wherein the limestone has CaO between 30% and 56%, and Loss On Ignition (LOI) between 20% and 45%.

7. The pozzolanic mixture of claim 1, wherein the pozzolanic mixture setting regulator is selected from calcium sulfate dihydrate (gypsum), calcium sulfate hemihydrate (basanite), calcium sulfate (anhydrite), and/or a combination thereof.

8. The pozzolanic mixture of claim 1, consisting essentially of:
- an activated clay between 30 and 70% (w/w);
- a limestone between 20 and 60% (w/w); and
- a pozzolanic mixture setting regulator between 3 and 8% (w/w).

9. The pozzolanic mixture of claim 1, having a particle size less than 75 microns.

10. The pozzolanic mixture of claim 1, having a Blaine specific surface between 5000 and 10000 $cm^2/g$.

* * * * *